United States Patent [19]

Moore

[11] 4,356,592
[45] Nov. 2, 1982

[54] VEHICLE ASSIST STRAP

[75] Inventor: Ronald D. Moore, Grosse Pointe, Mich.

[73] Assignee: Chivas Products, Limited, Sterling Heights, Mich.

[21] Appl. No.: 156,820

[22] Filed: Jun. 5, 1980

[51] Int. Cl.³ .......................... B60N 3/02; A47B 95/02
[52] U.S. Cl. ........................................ 16/125; 296/71; 5/466
[58] Field of Search .................... 16/125; 190/58 R; 296/71; 105/354; 5/466, 467

[56] References Cited

U.S. PATENT DOCUMENTS 3,183,549  5/1965  Hammesfahr ......................... 16/125
4,067,602  1/1978  Ahlisch ................................ 296/71

FOREIGN PATENT DOCUMENTS 1176012  8/1964  Fed. Rep. of Germany ........ 16/125
828420   2/1960  United Kingdom ............. 190/58 R Primary Examiner—Andrew V. Kundrat
Attorney, Agent, or Firm—Townsend and Townsend

[57] ABSTRACT

A vehicle assist strap, and more particularly, an improved assist strap having a central metal core with formed ends which cooperate with covers for concealing fasteners utilized for fastening the assist strap to a surface of the vehicle. The covers are locked in their operative positions to prevent tampering and removal thereof during normal use. The covers may however be non-destructively removed to permit access to the fasteners as desired.

17 Claims, 9 Drawing Figures

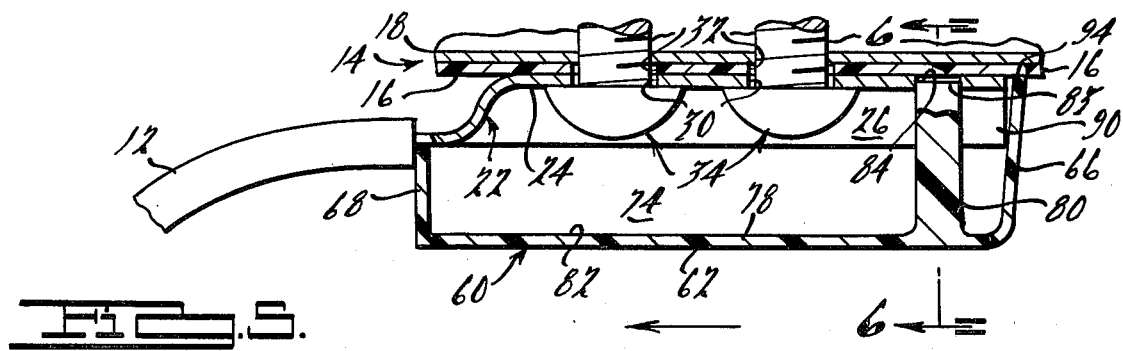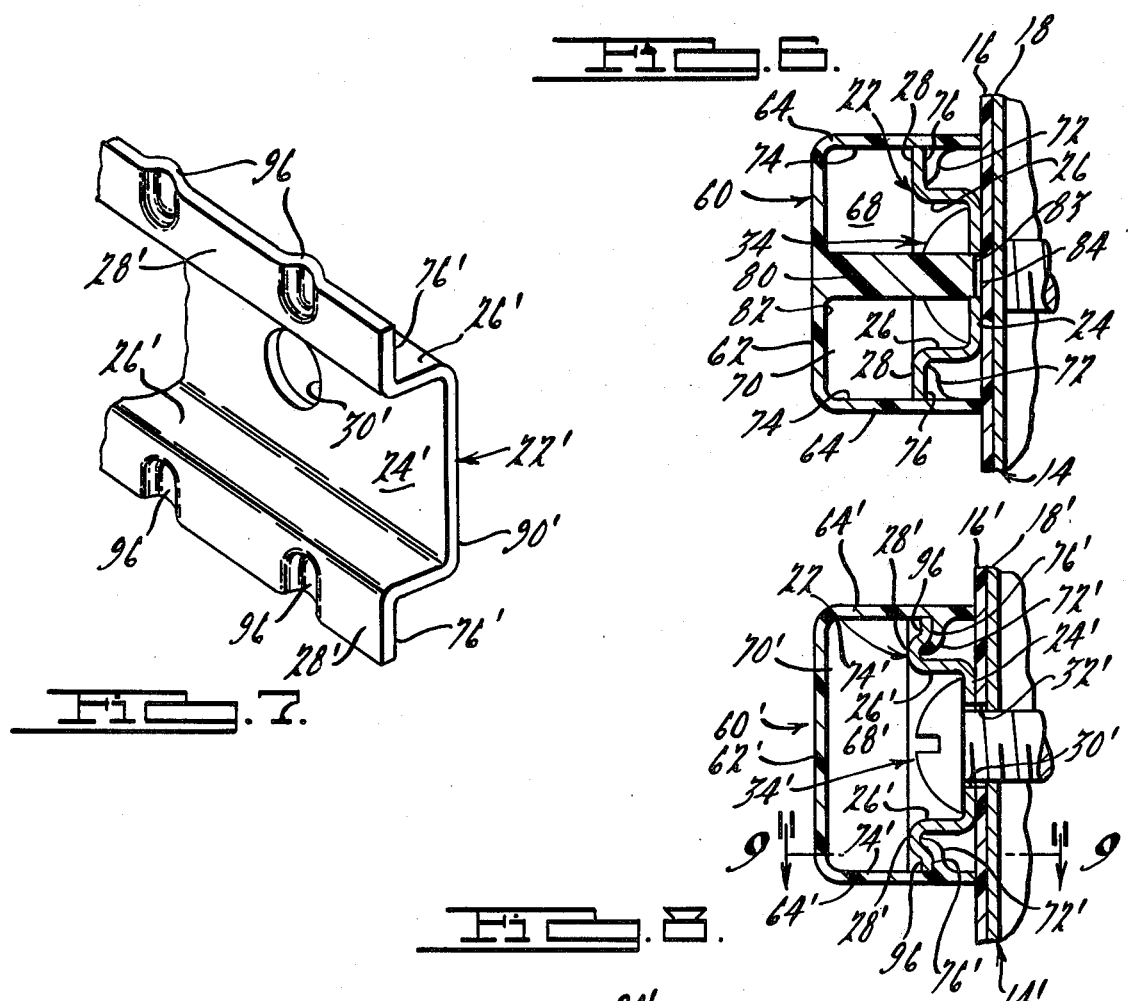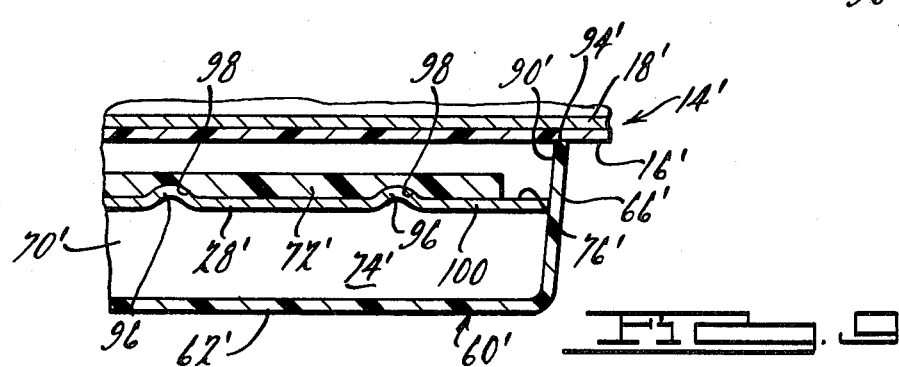

VEHICLE ASSIST STRAP

BACKGROUND AND SUMMARY OF THE INVENTION

Several approaches have been taken in providing fastening systems for automobile assist straps having escutcheon member-fastener combinations at the ends of the assist strap and covers for concealing the fasteners from view. However, prior known devices possess certain manufacturing and assembly disadvantages. Some of these devices include covers which are permanently attached to an escutcheon by an adhesive. This creates the disadvantage of having covers which cannot be readily removed to permit access to the fasteners for servicing the assist strap. Indeed, removal of such adhesively-attached covers can be tedious and time consuming, and usually results in partial or complete destruction of the cover.

While other devices have provided easily removable covers, such devices permit undesired tampering. More specifically, such covers can be readily removed by children or other passengers of such vehicles, resulting in exposed fastener assemblies. Since the purpose and function of such assist straps requires that they be placed in well exposed and highly accessible areas of the vehicle, these devices invite tampering by small children. Moreover, covers which are readily removable have a tendency to become lost, resulting in the expenditure of time and money by the vehicle owner to secure replacement thereof. Additionally, the fastener-cover systems of these prior devices ordinarily use multiple components which are separately manufactured and then assembled. This results in the disadvantage of requiring relatively costly manufacturing and assembly techniques. Since up to nine such straps have been used in an automobile, these costs are multiplied accordingly for each vehicle.

It is, therefore, desirable to provide a fastening system for automobile assist straps wherein the cover which cooperates with each end of the assist strap is removable therefrom to provide access to the fastening means for servicing the assist strap, but which is removable only by utilizing a particular removal method in order to reduce undesired tampering, as well as exposed and lost parts. It is also desirable to obtain these advantages while reducing manufacturing and assembly steps, as well as the costs associated therewith.

The automobile assist strap fastening system according to the present invention includes a generally flat metal strap member having formed ends to provide elongated generally U-shaped channels for attachment to a surface of the vehicle by way of fasteners disposed within the channels. The fastening system includes covers which are slidingly engageable with the channels and movable into operative positions where they cooperate with each channel to conceal the fasteners from view during normal use of the assist strap. Movement of each cover into its operative position will effect insertion of a locking portion disposed on one of either the cover or the channel into an opening or recess in the other of either the cover or the channel and create a locking engagement between the locking portion and the opening or recess so that the cover is retained in its operative position during normal use. However, the locking portion can be disengaged and withdrawn from the opening or recess upon the application of a predetermined force in a particular direction to enable the cover portion to be slidingly moved along the channel and removed therefrom to permit access to the fasteners for servicing the strap member.

The strap member of the invention is a structural strength-imparting member which establishes the configuration of the assist strap. The formed ends of the strap member provide an area for direct attachment to a vehicle surface and are configured to removably retain the covers. These formed ends can be simply and inexpensively formed along with the strap member by a stamping operation. The locking portion and the opening or recess on either the cover or the channel can also be provided during the forming of these portions. The invention therefore provides an assist strap system having the advantage of requiring the manufacture and assembly of fewer parts, and therefore results in an attendant lowering of manufacturing and assembly costs. The system provides an assist strap having good appearance, as well as one which allows a non-destructive removal of the covers to permit servicing of the assist strap. The invention also achieves a simple and inexpensive way of providing a cover which cooperates directly with the ends of the strap member and which can be locked in its operative position during normal use to reduce the possibility of tampering and exposed and lost parts, yet which can be removed for servicing the assist strap only upon discovering and following a particular method for loosening the covers.

The above and other features of the invention will become apparent from a reading of the detailed description of the preferred embodiments which makes reference to the following set of drawings.

BRIEF DESCRIPTION OF THE DRAWINGS

FIG. 5 is an elevational view, partially in section, of the cover as assembled in its operative position with the formed strap end;

FIG. 6 is a sectional view taken in the direction of Line 6—6 of FIG. 5;

FIG. 7 is a perspective view of a portion of a formed strap end in accordance with an alternative embodiment of the invention;

FIG. 8 is a sectional view of a cover portion in accordance with this embodiment, as assembled in its operative position with the formed strap end of FIG. 7; and FIG. 9 is a sectional view taken generally in the direction of Line 9—9 of FIG. 8.

DETAILED DESCRIPTION OF THE PREFERRED EMBODIMENTS

Figure 1:
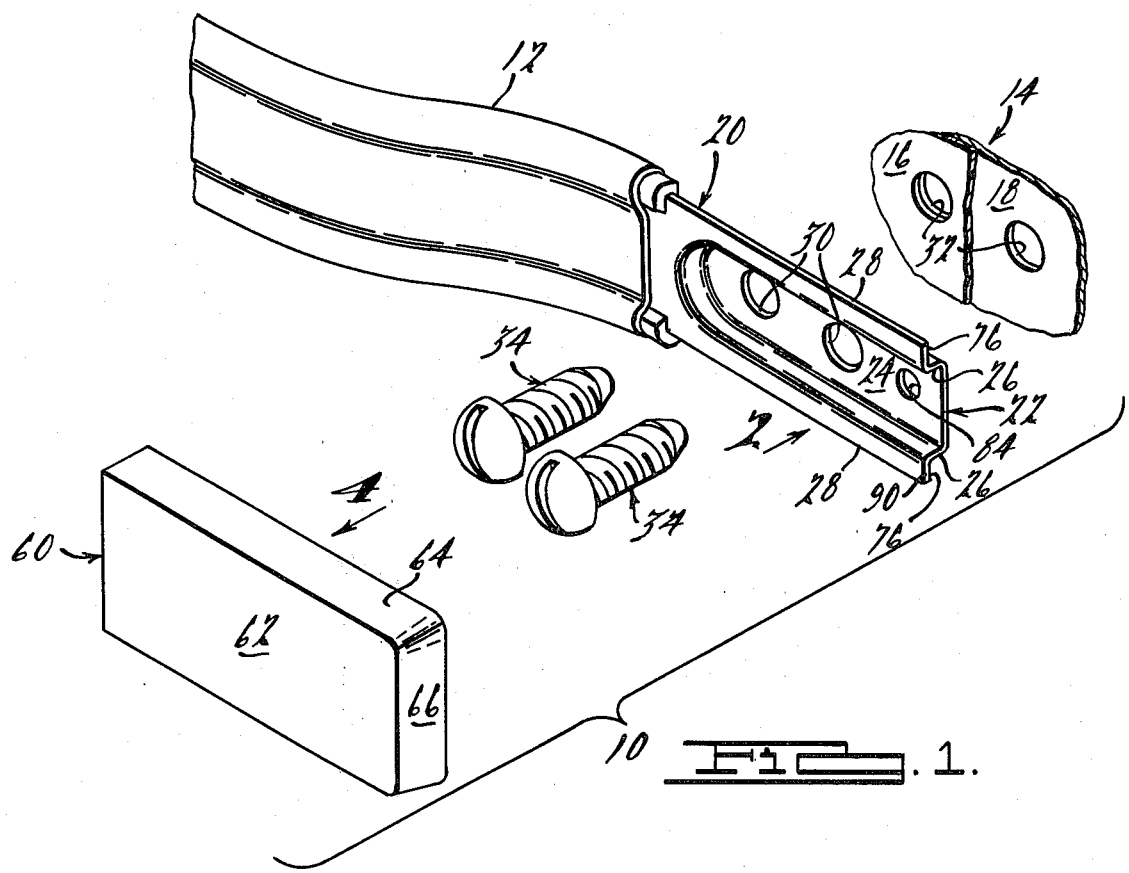
FIG. 1 is an exploded perspective view of the various components of one embodiment of the fastening system of the present invention.

Referring now to the drawings, a fastening system for automobile assist straps incorporating the teachings of the present invention is shown generally at 10. The fastening system 10 is utilized to fasten an assist strap 12 to a panel 14 or other surface of an automobile. The panel 14 has a decorative overlay 16 which may be of vinyl, vinyl and pressboard, cloth, or other material. The panel 14 also includes a metal plate or other backing 18. The assist strap 12 can be manufactured generally as shown in U.S. Pat. No. 4,174,988, issued Nov. 20, 1979, and assigned to the same assignee of the present invention.

Figure 2:
FIG. 2 is a top view of a portion of a formed strap end as assembled to a surface of a vehicle, taken in the direction of Arrow 2 of FIG. 1.
Figure 3:
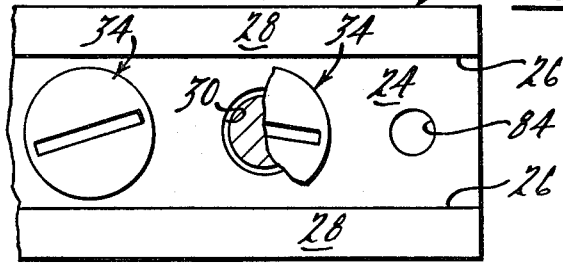
FIG. 3 is a sectional view taken in the direction of Line 3—3 of FIG. 2.
Figure 3:
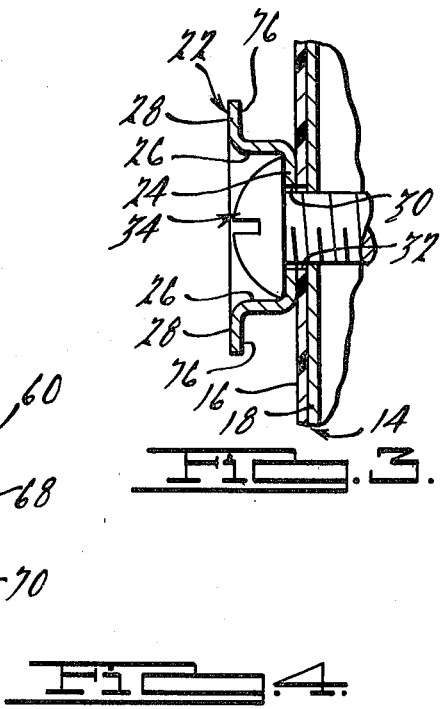

The assist strap 12 has a metal, strength-imparting core of flat strip stock. The core extends the length of the strap 12 and is formed at ends 20 as shown in FIG. 1, one such end being shown in FIG. 1. As illustrated most readily in FIG. 1, the formed end 20 defines a generally U-shaped channel member 22 having a longitudinally extending base 24 and two generally parallel longitudinally extending sidewalls 26. Each sidewall 26 is formed with a depending flange portion 28 along its length, whose function will be described more fully hereinafter. As shown in FIGS. 1 and 2, channel member 22 is provided with a pair of longitudinally spaced holes 30 which are suitably spaced along channel member 22 for alignment with a pair of holes 32 in panel 14. Holes 30 and 32 are adapted to receive a pair of threaded fasteners 34 for attaching the formed end 20 to panel 14. The fasteners 34 to be utilized in this connection may be the usual type of fasteners as shown, or may be a serrated fastener. In general terms, fasteners 34 comprise rounded-headed threaded fasteners which are self-threading into the metal backing 18 of the panel 14.

Figure 4:
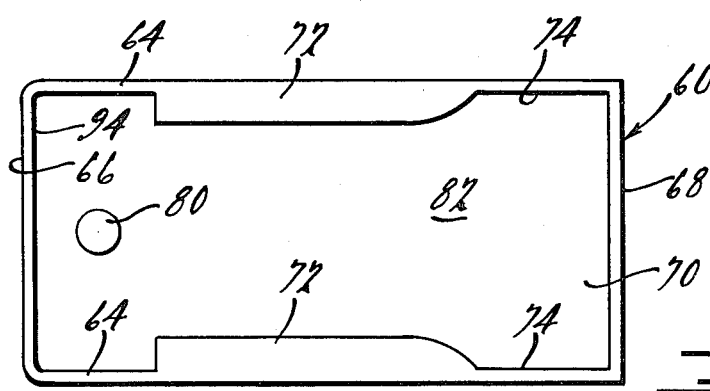
FIG. 4 is a bottom view of the cover of the embodiment of the invention shown in FIG. 1, taken in the direction of Arrow 4 thereof.

The fastening system 10 also includes a cover 60 which is slidingly engageable with channel member 22 to conceal channel member 22 and fasteners 34 as described more fully hereinafter. As shown in FIGS. 1 and 4, cover 60 includes a substantially planar cover surface 62, a pair of opposite longitudinally extending sidewalls 64, and a pair of opposite end walls 66 and 68. As illustrated in the drawings, cover 60 defines an enclosure 70 within which channel member 22 is received upon assembly of cover 60 therewith. Cover 60 also includes a longitudinally extending lip 72 formed along the interior surface 74 of each sidewall 64. As shown most readily in FIG. 6, lips 72 are operative to engage the undersurface 76 of each flange portion 28 during the sliding assembly of cover 60 with channel member 22.

Cover 60 also includes an integrally formed locking member or post 80 which extends substantially perpendicularly to the interior surface 82 of cover surface 62 across enclosure 70. As shown in FIGS. 5 and 6, locking post 80 is of a length substantially equal to the height of cover 60 and terminates in an end portion 83 which is operative to be received within a recess or opening 84 of similar diameter formed in base 24 of channel member 22. In this connection, it is to be noted that cover 60 is formed from a resilient plastic material. The material properties and the length of locking post 80 will therefore result in end portion 83 being initially engaged and deflected by base 24 when cover 60 is slid onto channel member 22. However, upon movement of cover 60 into its operative position shown in FIGS. 5 and 6, the end portion 83 of post 80 will snap into and engage opening 84. This engagement between end portion 83 and opening 84 will lock the cover 60 into the position shown in FIGS. 5 and 6 so as to conceal channel member 22 and the fasteners 34.

To utilize the fastening system 10 of this embodiment of the invention, assist strap 12 is fastened to panel 14 by aligning holes 30 in channel member 22 with holes 32 in panel 14 and installing fasteners 34 therein. Cover 60 may thereafter be slidingly assembled over channel member 22 by positioning the cover 60 adjacent the exposed end 90 of channel member 22 and sliding cover 60 in the direction of the arrow in FIG. 5 into its operative position shown therein. Movement of cover 60 in this manner will effect an engagement of lips 72 with the undersurface 76 of each flange portion 28, as well as an engagement between end portion 83 and opening 84 once cover 60 is placed in its operative position. These engagements result in an installation wherein cover 60 is locked in its operative position as shown in FIGS. 5 and 6. More specifically, the engagement between lips 72 and undersurfaces 76 of flange portions 28 will operate to retain cover 60 against lateral movement relative to channel member 22. On the other hand, the engagement of end portion 83 with opening 84 will secure or retain cover 60 against longitudinal movement relative to channel member 22.

When so retained in its operative position by the above-described engagements, cover 60 cooperates with the formed end 20 to effectively conceal channel member 22 and fasteners 34 from view. Moreover, the above-described engagements between cover 60 and channel member 22 insure that the cover 60 cannot be readily tampered with. However, cover 60 can be moved relative to formed end 20 and removed therefrom by an upward prying force exerted upon the end wall 66 of the cover 60. Such a force will tend to deflect that area of cover 60 upward and away from channel member 22 and effect a withdrawal of end portion 83 of locking post 80 from opening 84 and thereby break the engagement therebetween. The cover 60 may thereafter be slid along channel member 22 and removed therefrom. Application of the above-described upward force can be accomplished by the insertion of a screwdriver or the like between overlay 16 and end face 94 of end wall 66.

Another embodiment of the invention is illustrated in FIGS. 7 through 9. In these Figures, the parts which are similar to those illustrated and described in the first embodiment are indicated with the same numbers followed by a prime. In this embodiment, channel member 22' is provided with a longitudinally spaced pair of nubs 96 on undersurface 76' of each flange portion 28'. These nubs 96 are operative to be received within complementary shaped recesses 98 disposed in the upper surface 100 of lips 72' upon the sliding assembly of cover 60' into its operative position upon channel member 22', as shown in FIGS. 8 and 9. The purpose and function of these nubs 96 and recesses 98 are similar to that of end portion 83 of locking post 80 and opening 84 in the previously described embodiment. More specifically, the engagement of nubs 96 with recesses 98 will inhibit longitudinal movement of cover 60' with respect to channel member 22' and thereby effectively lock cover 60' in its operative position once it has been moved into that position. Cover 60' may however be slid along channel member 22' and removed therefrom by applying a combination of longitudinal and lateral forces sufficient to disengage nubs 96 from recesses 98.

In this embodiment, two nubs 96 and recesses 98 are provided on each lip 72' and adjacent flange portion 28'. However, the number of nubs 96 and recesses 98 may be varied as desired. It should also be noted that nubs 96 in this embodiment can be formed in flange portions 28' during the forming of channel member 22'. However, nubs 96 could also be provided in the form of projections on the undersurface 76' of each flange portion 28'. Alternatively, the configuration of nubs 96 and recesses 98 could be reversed while still achieving the results of this embodiment of the invention. More specifically, nubs 96 could be integrally formed longitudinally along the upper surface 100 of lips 72' of cover 60', while recesses 98 could be formed in the undersurface 76' of each flange portion 28' for receivably engaging nubs 96.

As is readily apparent from the preceding description, each of the embodiments of the invention provides a metal strap member or core which serves the function of a structural strength-imparting member and which establishes the configuration of the assist strap. The strap member of core extends the length of the strap and includes integral formed ends which provide an area for direct attachment to a vehicle surface, and which are configured to removably retain covers for concealing the fasteners used to attach the assist strap to the vehicle surface. The invention therefore provides an assist strap system having fewer parts than prior known devices. It therefore achieves a system requiring the manufacture and assembly of fewer parts, resulting in an attendant lowering of manufacturing and assembly costs.

It is also apparent that each of the above-described embodiments of the invention enables a non-destructive removal of the covers to permit servicing of the assist strap. Moreover, these embodiments provide a simple and efficient way of achieving a tamper resistant cover for a vehicle assist strap system, since the cover can be manipulated, loosened and removed only if one possesses knowledge of the required method for doing so. In addition, the engagements effected between the covers and the formed ends of the strap member increases the level of force necessary to loosen and/or remove the covers, thereby making it more difficult for children to tamper with the system. These features result in a fastening system which reduces the possibilities of exposed and lost parts. On the other hand, the fact that the covers can be simply and efficiently removed from the formed ends of the strap member when necessary results in a fastening system which allows access to the fasteners which attach the strap member to a vehicle surface so that the assist strap can be serviced or removed as desired.

It is readily apparent that the strap member can be simply and easily formed as one piece, with the disclosed ends being formed, and provided with the previously-described holes or recesses, flanges and nubs, in one stamping operation. The strap member can be provided with a decorative covering intermediate the formed ends as shown in FIGS. 1 and 5. The covers can be provided with a texture complementary with that of the covering over the strap member so that the assist strap has good appearance and is aesthetically pleasing.

It is understood that the foregoing description is that of the preferred embodiments of the invention and that various changes and modifications may be made thereto without departing from the spirit and scope of the invention, as defined in the appended claims.

What is claimed is:

1. An assist strap for attachment to a surface, said strap comprising a strength-imparting substantially flat strap member extending the length of said strap and having at least one end formed to provide an integral base portion and a pair of integral longitudinally-extending flanges, said flanges being disposed on respective sides of said formed end with each flange providing a contiguous axial extension of the surface of said strap member, fastening means associated with said base portion for fastening said strap member to said surface, a cover having a pair of inwardly extending lips slidingly engageable with said longitudinally-extending flanges and movable therealong in one direction to a first position wherein each such lip engages a respective one of said longitudinally extending flanges to secure said cover to said formed end and whereby said cover conceals said fastening means, said cover being slidable along said longitudinally-extending flanges in an opposite direction to a second position wherein said pair of lips disengage said pair of flanges and whereby said fastening means is exposed.

2. An assist strap as set forth in claim 1 further comprising retaining means for removably retaining said cover in said first position.

3. An assist strap as set forth in claim 1 wherein said cover includes a locking portion which is receivingly engaged by said base portion for retaining said cover in said first position when said cover is moved into said first position.

4. An assist strap as set forth in claim 3 wherein said locking portion is disengageable from said base portion to permit movement of said cover from said first position to said second position.

5. An assist strap as set forth in claim 1 wherein said formed end includes a locking means which is receivingly engaged by a locking portion of said cover for retaining said cover in said first position when said cover is moved into said first position.

6. An assist strap as set forth in claim 5 wherein said locking means is disengageable from said locking portion of said cover to permit movement of said cover from said first position to said second position.

7. An assist strap as set forth in claim 5 wherein said locking means includes an integral portion of said pair of flanges which is configured cooperatively with said locking portion of said cover.

8. An assist strap as set forth in claim 1 wherein said formed end includes a plurality of projections extending from a surface thereof, said projections being receivably engaged by a like number of recesses in said cover when said cover is moved into said first position to form an engagement for retaining said cover in said first position.

9. An assist strap as set forth in claim 8 wherein said plurality of projections are formed integrally with said pair of flanges and extend from a surface thereof.

10. An assist strap as set forth in claim 1 wherein said cover includes a depending portion on each side thereof which engages a respective one of said pair of flanges to retain said cover against lateral movement relative to said formed end.

11. An assist strap as set forth in claim 1 wherein said cover defines an enclosure within which said formed end is received when said cover is moved into said first position.

12. An assist strap as set forth in claim 11 wherein said cover includes a depending portion on each side thereof defining said enclosure which slidingly engages a respective one of said pair of flanges to retain said cover against lateral movement relative to said formed end during movement of said cover between said first and second positions.

13. An assist strap as set forth in claim 12 wherein said cover defines an enclosure within which said formed end is received when said cover is moved into said first position, said cover including a first depending portion within said enclosure which slidingly engages said flange portion to retain said cover against lateral movement relative to said formed end during movement of said cover between said first and second positions and an end depending portion also defining said enclosure which is receivingly engaged by said base portion upon movement of said cover into said first portion.

14. An assist strap as set forth in claim 1 wherein said base portion includes a hole, and said cover includes a depending portion which is received within said hole and engaged thereby when said cover is moved into said first position, the engagement between said depending portion and said hole being operative to prevent movement of said cover from said first position.

15. An assist strap as set forth in claim 14 wherein said depending portion has resiliency and is operative to be engaged and deflected from its normal position by said base portion during movement of said cover between said first and second positions, said depending portion being further operative to return to its normal position and snap into said hole upon movement of said cover into said first position.

16. An assist strap as set forth in claim 14 wherein each said depending portions are disengaged from said openings by the application of a force directed to disengage each said locking portion from said opening.

17. An assist strap according to claim 1 wherein said strap member is a metal strap.

* * * * *